United States Patent
DeLuca et al.

(10) Patent No.: US 8,918,448 B2
(45) Date of Patent: Dec. 23, 2014

(54) APPLICATION COMPONENT DECOMPOSITION AND DEPLOYMENT

(75) Inventors: Lisa Seacat DeLuca, San Francisco, CA (US); Brian D. Goodman, Redding, CT (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 13/470,090

(22) Filed: May 11, 2012

(65) Prior Publication Data

US 2013/0304788 A1 Nov. 14, 2013

(51) Int. Cl.
G06F 15/16 (2006.01)
(52) U.S. Cl.
USPC .......................................... 709/201; 709/200
(58) Field of Classification Search
USPC ................................................. 709/200, 201
See application file for complete search history.

(56) References Cited

U.S. PATENT DOCUMENTS

| | | | |
|---|---|---|---|
| 7,181,731 B2 * | 2/2007 | Pace et al. ...................... | 717/136 |
| 7,284,054 B2 * | 10/2007 | Radhakrishnan ............. | 709/226 |
| 7,814,470 B2 * | 10/2010 | Mamou et al. ................ | 717/162 |
| 8,239,505 B2 * | 8/2012 | Sedukhin et al. ............. | 709/221 |
| 8,473,468 B2 * | 6/2013 | Pace et al. ...................... | 707/695 |
| 2003/0131084 A1 * | 7/2003 | Pizzorni et al. ................ | 709/223 |
| 2003/0182656 A1 * | 9/2003 | Leathers et al. ............... | 717/177 |
| 2003/0188291 A1 | 10/2003 | Fisher | |
| 2004/0143826 A1 | 7/2004 | Gissel et al. | |
| 2005/0159927 A1 | 7/2005 | Cruz et al. | |
| 2007/0088956 A1 * | 4/2007 | Goldstein et al. ............. | 713/176 |
| 2007/0157191 A1 * | 7/2007 | Seeger et al. ................. | 717/168 |
| 2007/0255713 A1 * | 11/2007 | Li et al. ............................. | 707/9 |
| 2008/0033785 A1 | 2/2008 | Anke | |
| 2008/0189679 A1 * | 8/2008 | Rodriguez et al. ............ | 717/105 |
| 2008/0306798 A1 | 12/2008 | Anke et al. | |
| 2010/0199259 A1 | 8/2010 | Quinn et al. | |
| 2010/0325339 A1 * | 12/2010 | Ogawa et al. ................. | 711/103 |
| 2012/0005166 A1 * | 1/2012 | Pace et al. ...................... | 707/654 |
| 2012/0066287 A1 * | 3/2012 | Hajost ............................ | 709/203 |
| 2012/0092378 A1 * | 4/2012 | Beck et al. ..................... | 345/660 |
| 2012/0136684 A1 * | 5/2012 | Pulido De Los Reyes et al. ............................ | 705/7.11 |
| 2012/0159425 A1 * | 6/2012 | Shukla et al. ................. | 717/104 |
| 2013/0091252 A1 * | 4/2013 | Pizzorni et al. ............... | 709/219 |
| 2013/0110730 A1 * | 5/2013 | Bostick et al. ................ | 705/301 |
| 2013/0151317 A1 * | 6/2013 | Charfi et al. ................. | 705/7.36 |
| 2014/0201615 A1 * | 7/2014 | Rajkumar et al. ............ | 715/234 |

OTHER PUBLICATIONS

"On Demand Deployment of Service Components in a Service Oriented Architecture", ip.com, IPCOM000153862D, Jun. 12, 2007.

(Continued)

*Primary Examiner* — Anthony Mejia
(74) *Attorney, Agent, or Firm* — Matthew H. Chung; Yee & Associates, PC (57) ABSTRACT

A computer implemented method, a data processing system, and a computer program product deploy application components within a distributed environment. A Runtime management platform opens an application archive for an application to be deployed onto a distributed computing environment. The runtime management platform identifies a set of application components for the application. The runtime management platform identifies at least one set of rules defining application component deployment patterns for the set of application components. The runtime management platform deploys the set of application components to a set of runtime containers according to the at least one set of rules defining the application component deployment patterns.

18 Claims, 5 Drawing Sheets

(56) References Cited

OTHER PUBLICATIONS

"The System and Method of Automatically Detecting Common Deployment Time Dependency for Enterprise or OSGI Applications Using Declarative Approach and Re-Use the Common Dependency for Runtime Environment", ip.com, IPCOM000212195D, Nov. 4, 2011.

"Optimized Deployment of Enterprise Applications in a Websphere Cluster" ip.com IPCOM000212605D, Nov. 18, 2011.

Cohen et al., "AspectJ2EE= AOP +J2EE Towards an Aspect Based, Programmable and Extensible Middleware Framework" Department of Computer Science, Haifa Israel, Jun. 2004.

* cited by examiner

APPLICATION COMPONENT DECOMPOSITION AND DEPLOYMENT

BACKGROUND

1. Field

The disclosure relates generally to deploying applications within a cloud infrastructure. More specifically, the disclosure relates to optimizing deploying application components among various nodes and virtual machines within a cloud infrastructure.

2. Description of the Related Art

Object-oriented programming ("OOP") methodologies are well known and widely adopted, as they promote efficient team development of software products, allow minimized maintenance activities, and provide abilities to easily and dependably integrate modules and objects from older designs, other designers, and new designs together.

In contrast to procedural programming methodologies, OOP allows programmers to define data types of data structures and types of operations or functions which can be performed on those data structures, which defines the data structure as an "object". Relationships between objects may be defined, as well, such that some objects may share or "inherit" characteristics from other objects, allowing variations of existing objects to be quickly and efficiently developed. Categories of objects are referred to as a "class" of objects. Objects of a given class share common properties as defined by the class.

A number of companies have developed and marketed software development tools which support OOP programming languages ("OOPL"), including but not limited to Xerox Corporation's Smalltalk, Bell Laboratory's C++, Microsoft Corporation's Visual C++, Sun Microsystems' Java, and Open Management Group's ("OMG") Unified Modeling Language ("UML") are programming languages which, among others, implement OOP concepts and methodologies.

In particular, Sun Microsystem's Java language has gained widespread use for its support of Internet technologies, such as "applets" and embedded Java scripts in web pages, "servlets" which can be run by a web server or application program server, etc. Java is especially useful for its portability or non-machine-specific design, which enables Java code to be run or executed by any computing platform which is equipped with a Java interpreter. The "open" nature of Sun's Java specifications has also allowed many vendors to participate in the marketplace, whether by developing and providing application programs, administrative tools, or programming tools.

Java code is pseudo-compiled into "bytecode", which is later executed by a machine-specific Java interpreter. The interpreter converts the bytecodes to machine-specific instructions which are executed by the particular computer on which the Java program is being executed. Java defines the virtual computer for which the bytecode is designed as a "virtual machine", and thus, programming is done as if it is to be executed by the theoretical virtual machine. During actual execution on a computer, one or more Java Virtual Machines ("JVM") may be created by the computer's operating system, each JVM executing Java programs as if it were a real, independent computer. Java code can also be converted directly into machine-specific executable language using a special compiler, the results of which may also be executed within a JVM.

An enterprise server generally refers to a mainframe class computer which is suitable for running programs of a magnitude commensurate with an "enterprise", such as making bulk airline reservations online, tracking large real time trading and commodities, etc. Java 2 Platform Enterprise Edition ("J2EE"), which was developed by Sun Microsystems with other notable partners such as International Business Machines ("IBM"), provides a Java-compliant platform for enterprise class computers, and is in many ways a subset of functionality of the Java 2 Platform Standard Edition ("J2SE").

J2EE provides several key features which make it useful in enterprise computing environments, including support for a "thin client" tiered arrangement between client computers and servers, as well as supporting platform-independence of modules and code (e.g. portability) so that vendors may easily target a wide array of enterprise computers with a single design of software. These features make J2EE an ideal programming methodology for us in a cloud computing service model.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

SUMMARY

According to one embodiment of the present invention, a computer implemented method, computer system, and computer program product for deploying application components within a distributed environment. A runtime management platform opens an application archive for an application to be deployed onto a distributed computing environment. The runtime management platform identifies a set of application components for the application. The runtime management platform identifies at least one set of rules defining application component deployment patterns for the set of application components. The runtime management platform deploys the set of application components to a set of runtime containers according to the at least one set of rules defining the application component deployment patterns.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud service Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
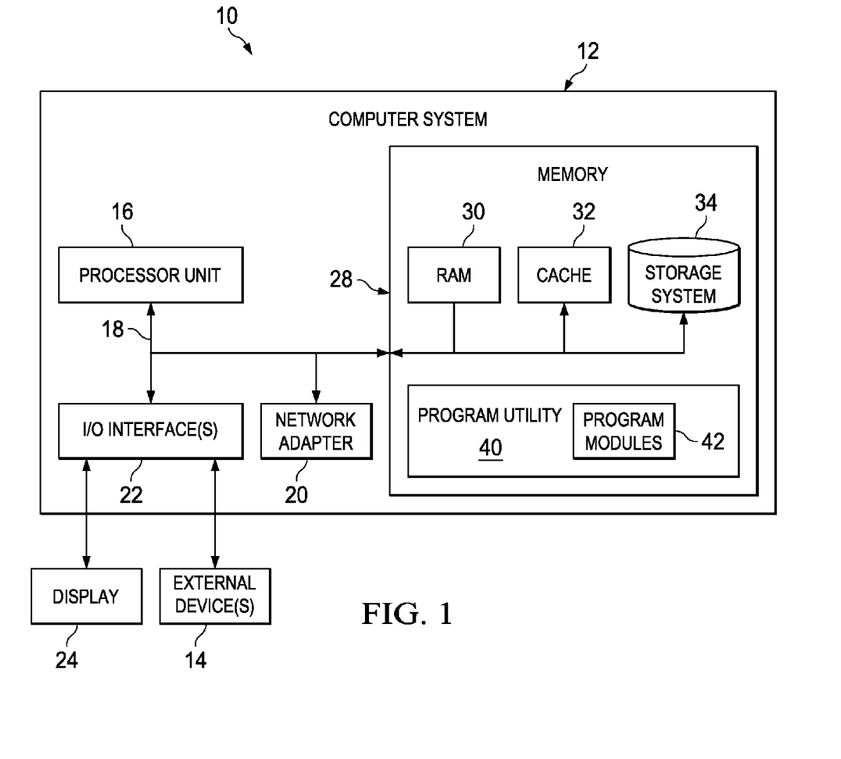
FIG. 1 is a schematic of an example of a cloud computing node according to an illustrative embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
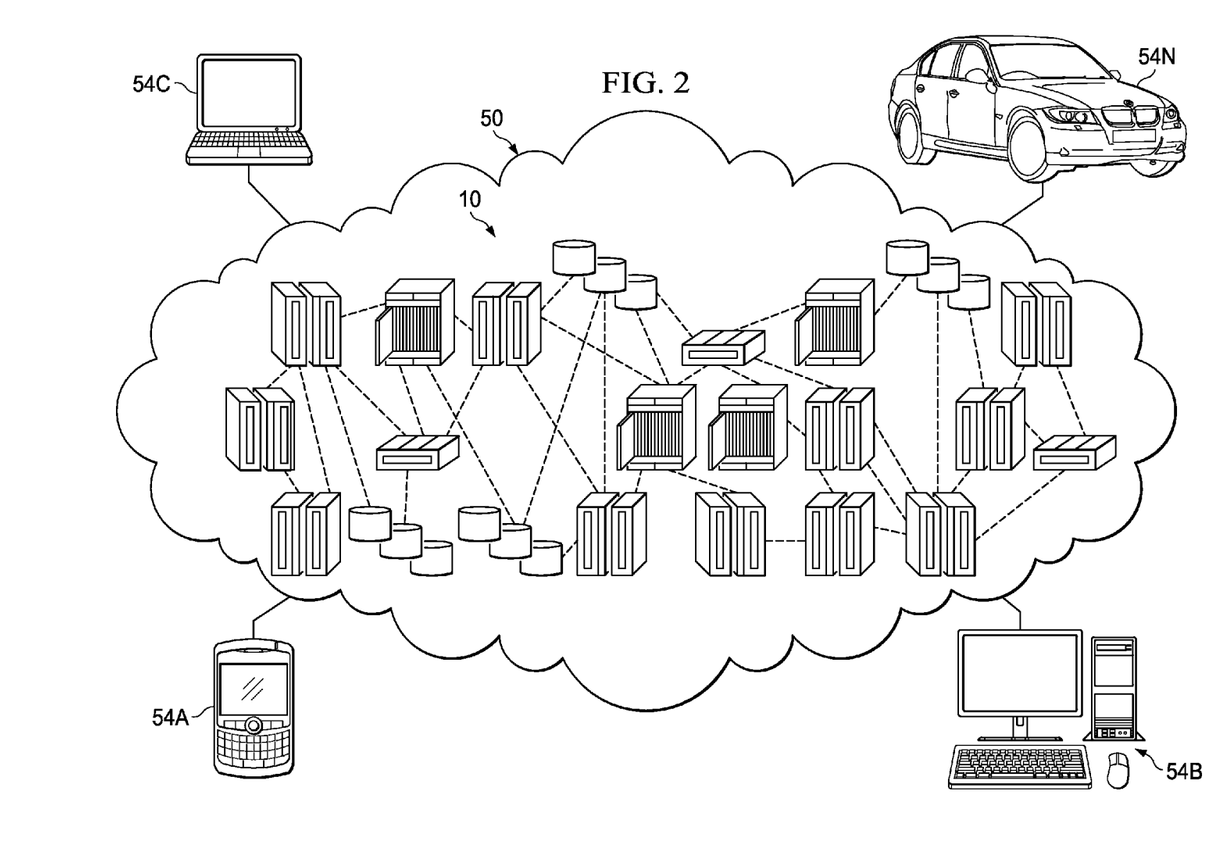
FIG. 2 is an illustrative cloud computing environment depicted according to an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
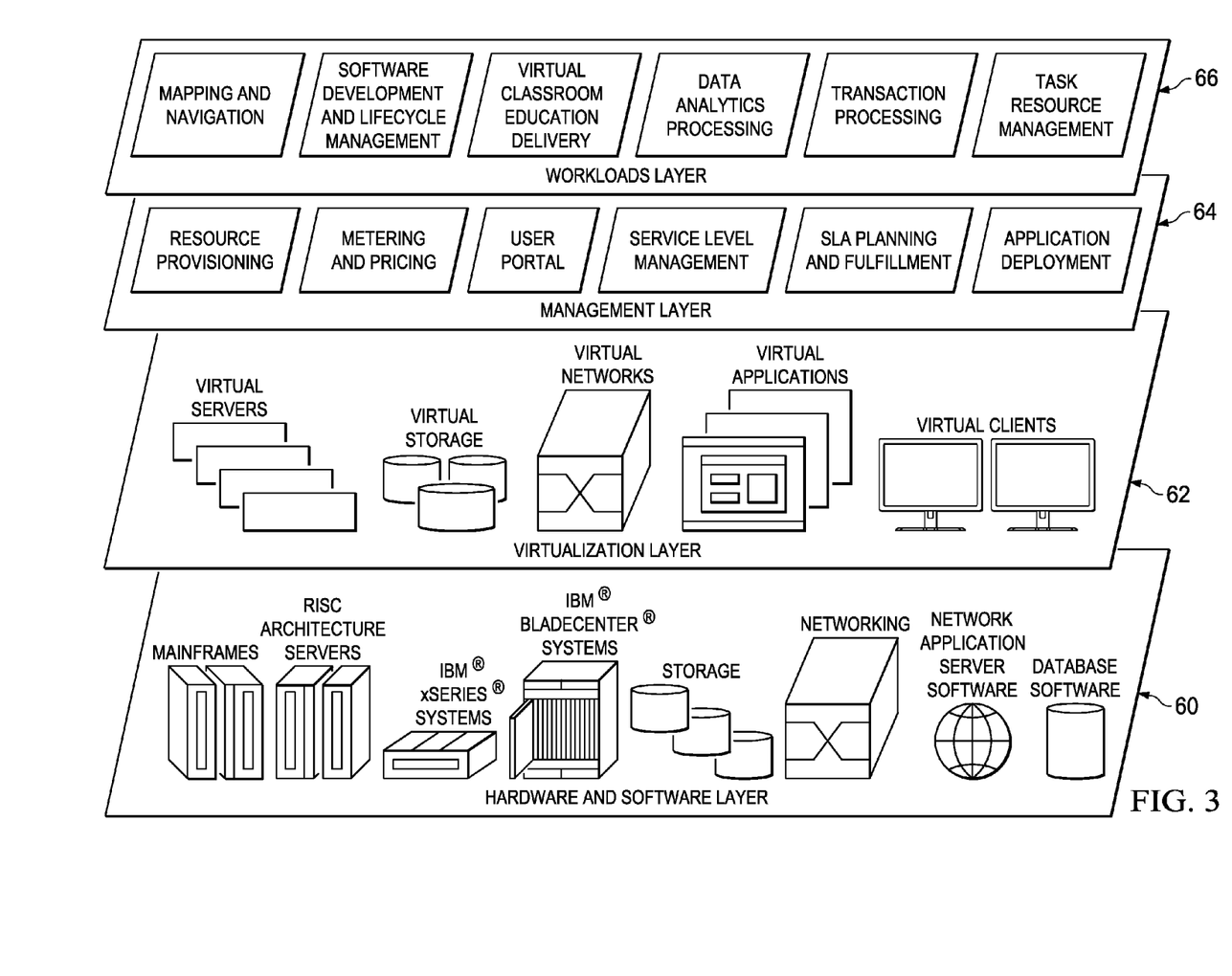
FIG. 3 is a set of functional abstraction layers provided by cloud computing environment according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In one example, management layer 64 may provide the functions described below. Applications, including all of the application components that comprise the application, are typically deployed to a common nodes or virtual machines within a cloud infrastructure. Thus, each instance of an application will contain each application component required for execution of the application.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop processing.

Cloud computing applications today are declarative by nature. An application within a hosting environment consists of multiple software servers performing different functions for the application. For example, a database servers may host database functions, web servers might be required for handling hypertext markup language requests, as well as the application servers for executing code for the actual application. This myriad of servers creates a topology of what the application essentially is: a collection of a certain number of machines of various types that handles a certain level of scale.

While the application topology provides one view of what servers are required to execute the application at the desired scale, the application topology does not necessarily provide an optimized deployment of the various servers. A typical application may utilize a web server, an application server and a database server, all of which can be deployed onto a single virtual machine. During deployment of the application, each of these required servers will, by default, by deployed on each instance of the application run platform.

However, by deploying each of the web servers, the application server and the database server onto separate virtual machines, the application gains flexibility to scale those servers separately from one another. For example, front end web servers can be added to scale a customer touch point, while application servers can be separately added to separately scale application performance.

Object-oriented programming ("OOP") applications, such as Java 2 Enterprise Edition applications, are comprised of components that make up the application. Runtime management platforms such as WebSphere Application Server, allows a user to manually configure the deployment of specific application components to specific nodes within a cluster. WebSphere Application Server is a trademark of International Business Machines Corporation registered in many jurisdictions worldwide. The deployment of specific application components to specific nodes allows for different application components making up a single application to potentially scale independently while logically remaining and being managed as single application.

However, in order to take advantage of this more complex deployment provided by runtime management platforms, users and operators needs to understand the deployment topology and component architecture of the underlying infrastructure. Moreover, resources in a deployment may shift overtime making past decisions no longer valid. With the increasing use of virtualization and automation in a cloud computing environment, users and operators need to be less involved in the actual deployment of applications and more engaged in the allocated resource parameters of their application.

The illustrative embodiments achieve these scaling benefits by decomposing an application into the various components, without requiring a user to understand the topology of the deployed components.

The illustrative embodiments of the present invention provide a computer implemented method, computer system, and computer program product for deploying application components within a distributed environment. A runtime management platform opens an application archive for an application to be deployed onto a distributed computing environment. The runtime management platform identifies a set of application components for the application. The runtime management platform identifies at least one set of rules defining application component deployment patterns for the set of application components. The runtime management platform deploys the set of application components to a set of runtime containers according to the at least one set of rules defining the application component deployment patterns.

Figure 4:
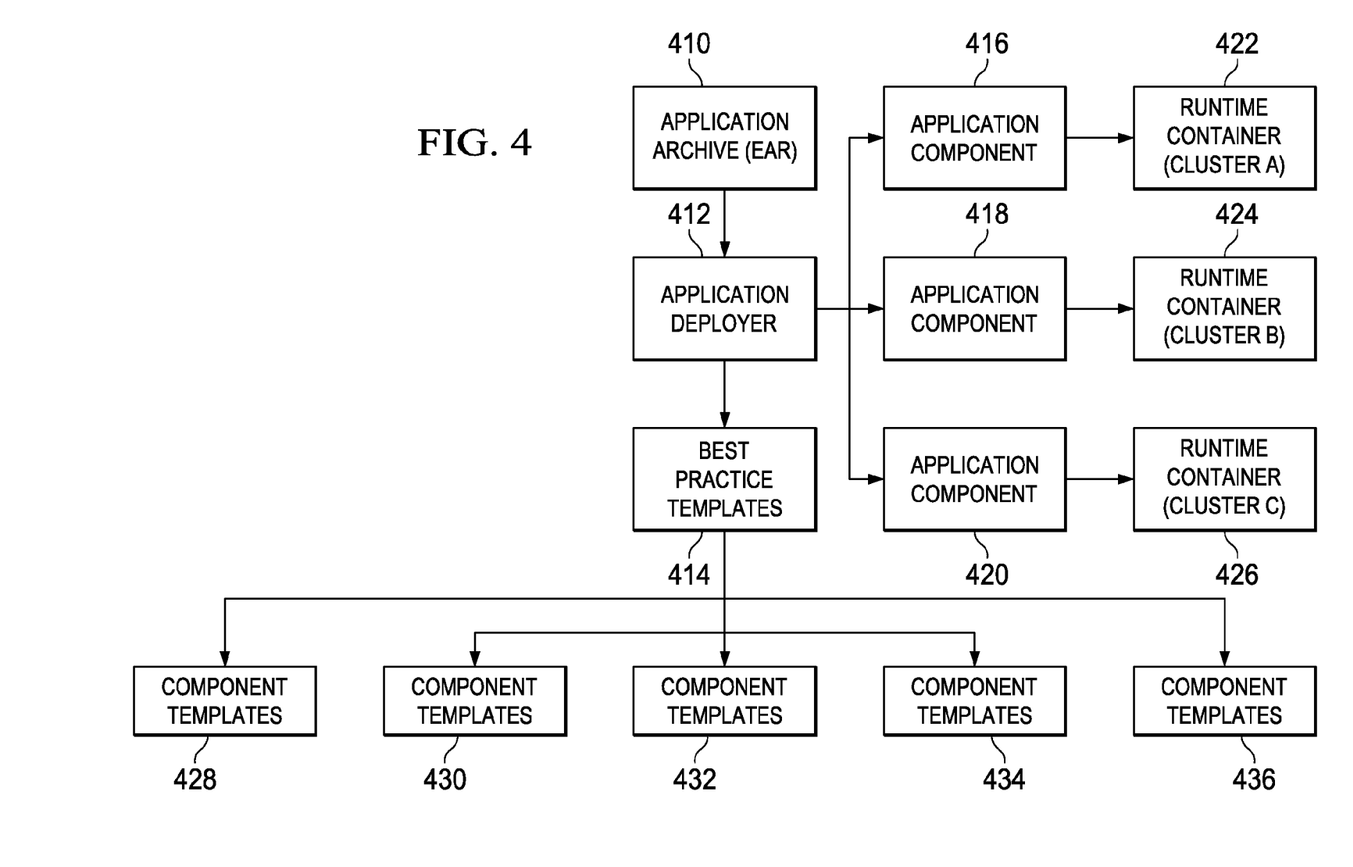
FIG. 4 is a runtime management platform shown according to an illustrative embodiment.

Referring now to FIG. 4, a runtime management platform is shown according to an illustrative embodiment. Runtime management platform 400 is a software application, executing within a management layer of a cloud computing environment, such as management layer 64 of FIG. 3.

Application archive 410 is a file that is composed of one or more files along with metadata that can include source volume and medium information, file directory structure, error detection and recovery information, file comments, and usually employs some form of lossless compression. Application archive 410 files may be encrypted in part or as a whole. Application archive 410 is used to collect multiple data files together into a single file for easier portability and storage, or simply to compress files to use less storage space.

In one illustrative embodiment, application archive 410 is an enterprise archive repository (EAR). Enterprise archive repository is a file format used by object-oriented programming ("OOP") methodologies, such as Java 2 Platform Enterprise Edition, for packaging one or more modules into a single archive so that the deployment of the various modules onto an application server happens simultaneously and coherently. Enterprise archive repository contains extensible markup language metadata files, sometimes called deployment descriptors, which provide details on how to deploy the application components contained within the enterprise archive repository.

Application archive 410 includes metadata markups that define the various application components for the associated application. Application archive 410 allows the various application components to be contained within a single file.

Application deployer 412 configures and deploys the applications within application archive 410. Application deployer 412 administers the computing and networking infrastructure where applications within application archive 410 run. Application deployer 412 oversees the runtime environment, including setting transaction controls and security attributes and specifying connections to databases.

During configuration, application deployer 412 follows instructions to resolve external dependencies, specify security settings, and assign transaction attributes. During installation, application deployer 412 moves the application components to the server and generates the container-specific classes and interfaces.

In one illustrative embodiment, application deployer 412 uses best practices templates 414 to deploy application components 416-420 to separate runtime containers 422-426.

Best practices templates 414 are sets of rules defining application component deployment patterns detailing the topology for dynamically adding and removing discrete units of application components and resources utilized by those application components. Best practices templates 414 maximize scalability stability and performance of the application. Best practices templates 414 may also consider other existing applications already executing on the various virtual machines of the infrastructure.

In one illustrative embodiment, best practices templates 414 are unknown and learned based on monitoring information collected regarding current or previous deployments of application components. In one illustrative embodiment, best practices templates 414 can be overruled by the user specified deployment preferences, including but not limited to, clustering of similar application components, distributing of similar application components, scaling ratios of similar application components, as well as the colocation and duplication of similar application components to various isolated nodes having runtime containers therein, such as runtime containers 422-426.

Best practices templates 414 are comprised of component templates 428-436. Each of component templates 428-436 is a deployment pattern for a specific application component, such as one of application components 416-420.

Application components 416-420 are the different elements together which comprise an application. Application components 416-420 can be, for example but not limited to, web applications, enterprise java beans, web services uniform resource identifiers (URI), web components, message queues, batch processes and data sources. Web applications and web components may deliver, for example but not limited to, HTML, java scripts, and servelets. Enterprise java beans may, for example but not limited to, connect the application to a particular database. Batch process may, for example but not limited to, be long running tasks that may not have any interaction with a user.

Each of application components 416-420 is deployed to a separate one of runtime containers 422-426. Each of runtime containers 422-426 container is the execution environment for one of Application components 416-420. runtime containers 422-426 execute in separate memory space. In an illustrative embodiment, one or more of runtime containers 422-426 are deployed on separate nodes within a cluster. By deploying runtime containers 422-426 on separate nodes, application components 416-420 can potentially scale independently while logically remaining and being managed as a single application.

In one illustrate embodiment, application deployer 412 may deploy application components 416-420 such that each runtime container has a different role. For example, application deployer 412 may allocate all application components 416-420 that are batch processes to runtime container 422. Application deployer 412 may allocate all application components 416-420 that are EJB runtime processes to runtime container 424. Application deployer 412 may allocate all application components 416-420 that are web application delivery processes to runtime container 426.

Figure 5:
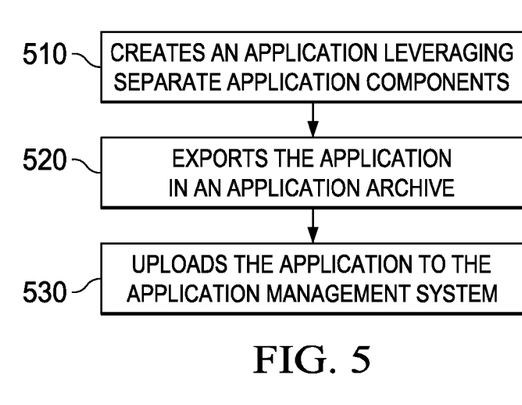
FIG. 5 is a flowchart for the creation of an application archive shown according to an illustrative embodiment.

Referring now to FIG. 5, a flowchart for the creation of an application archive is shown according to an illustrative embodiment. Process 500 is a software process executing on a software component, such as runtime management platform 400 of FIG. 4.

Process 500 begins when a user creates an application leveraging separate application components (step 510). The application components can be application components 416-420 of FIG. 4. In one illustrative embodiment, the application can be created using an object-oriented application architecture, such as J2EE. In one illustrative embodiment, the application components can include, web, enterprise java beans, and batch processing components defined by the J2EE application architecture. Other application architecture supporting metadata deployment descriptors describing how to deploy the application components can also be utilized.

The user exports the application in an application archive (step 520). The application archive includes all application components and metadata required for an application deployer, such as application deployer 412 of FIG. 4, to unarchive and configure the application by the user. In one illustrative embodiment, the application archive is an enterprise archive repository (EAR) file.

The user uploads the application to the application management system (step 530), with the process terminating thereafter. The Application management system can be for example, application management system 400 of FIG. 4.

Figure 6:
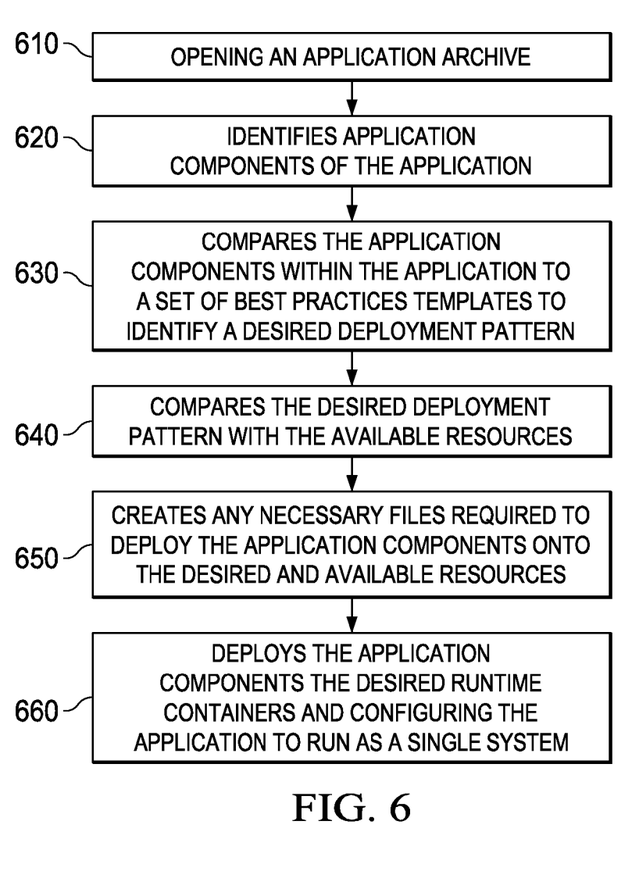
FIG. 6 is a flowchart for decomposing an application into application components and deploying those application components in a distributed and scaled manner according to an illustrative embodiment.

Referring now to FIG. 6, a flowchart for decomposing an application into application components and deploying those application components in a distributed and scaled manner is shown according to an illustrative embodiment. Process 600 is a software process, executing on a software component, such as application management system 400 of FIG. 4.

Process 600 begins by opening an application archive (step 610). The Application archive can be, for example, application archive 410 of FIG. 4. The application archive is composed of application components, such as application components 416-420 of FIG. 4. In one illustrative embodiment, the application archive is an enterprise archive repository (EAR). Enterprise archive repository is a file format used by object-oriented programming ("OOP") methodologies, such as Java 2 Platform Enterprise Edition, for packaging one or more modules into a single archive so that the deployment of the various modules onto an application server happens simultaneously and coherently. Enterprise archive repository contains extensible markup language metadata files, sometimes called deployment descriptors, which provide details on how to deploy the application components contained within the enterprise archive repository.

Process 600 identifies application components of the application (step 620). In one illustrative embodiment, process 600 identifies the application components by reading metadata associated with the application. This metadata supports annotating the application components. The metadata can include annotations describing, for example but not limited to, web applications, enterprise java beans, web services uniform resource identifiers (URI), web components, message queues, batch processes and data sources.

Process 600 then compares the application components within the application to a set of best practices templates to identify a desired deployment pattern (step 630). The desired deployment pattern is a specific one of best practices templates that is to be utilized for deploying the application components to the various runtime containers. The best practices templates can be, for example, best practices templates 414 of FIG. 4. In one illustrative embodiment, the best practices templates are predefined templates, including default patterns for clustering, distributing, scaling ratios, colocation and duplicating application components to various isolated nodes having runtime containers therein, such as runtime containers 422-426 of FIG. 4. The various isolated nodes can include, but are not limited to, separate hardware, separate networks, and separate processes. In one illustrative embodiment, the best practices templates are unknown and learned based on monitoring information collected regarding current or previous deployments of application components. In one illustrative embodiment, the best practices templates can be overruled by the user specified deployment preferences, including but not limited to, clustering, distributing, scaling ratios, colocation and duplicating application components to various isolated nodes having runtime containers therein, such as runtime containers 422-426 of FIG. 4.

Process 600 then compares the desired deployment pattern with the available resources (step 640). Available resources can include existing and available resources, as well as potential resources. Existing and available resources can include any resources allocated to a virtual machine housing a particular runtime container. Potential resources can include any additional resources can be added during runtime of the application when operating in cloud computing environment. In one illustrative embodiment, potential resources can include the over-committing of shared resources already logically allocated to other virtual machines in order to optimize resource utilization.

Process 600 then creates any necessary files required to deploy the application components onto the desired and available resources (step 650). The files can be, for example, software artifacts.

In one illustrative embodiment, process 600 can optionally allocate additional resources within the cloud computing platform. An application management system could then automatically extend the eventual deployment of the application based on the allocated resources.

In one illustrative embodiment, process 600 can optionally extend the eventual deployment of the application based on the propensity for load distribution of the application as guided by a best practices template, such as one of best practices templates 414. In one illustrative embodiment, the best practice template can be optionally overruled by a user specifying deployment preferences, including but not limited to, scaling ratios or colocation requirements.

Process 600 then deploys the application components the desired runtime containers and configuring the application to run as a single system (step 660), with the process terminating thereafter.

Thus, illustrative embodiments of the present invention provide a computer implemented method, computer system, and computer program product for deploying application components within a distributed environment. A runtime management platform opens an application archive for an application to be deployed onto a distributed computing environment. The runtime management platform identifies a set of application components for the application. The runtime management platform identifies at least one set of rules defining application component deployment patterns for the set of application components. The runtime management platform deploys the set of application components to a set of runtime containers according to the at least one set of rules defining the application component deployment patterns.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for deploying an application, the method comprising:
a computer opening an application archive for an application to be deployed onto a distributed computing environment;

the computer identifying a set of application components for the application;

the computer identifying at least one sets of rules defining application component deployment patterns for the set of application components; and the computer deploying the set of application components to a set of runtime containers according to the at least one set of rules defining the application component deployment patterns, wherein the application component deployment patterns comprises default patterns for clustering the set of application components, distributing the set of application components, scaling ratios for the set of application components, colocation requirements for the set of application components and duplicating requirements for the application components.

2. The computer implemented method of claim 1, wherein the application archive includes extensible markup language metadata files that provide details on how to deploy the set of application components contained within the application archive.

3. The computer implemented method of claim 2, wherein the application archive is an enterprise application archive file, and wherein the extensible markup language metadata files are deployment descriptors for the set of application components.

4. The computer implemented method of claim 1, wherein the application components are selected from the group consisting of web applications, enterprise java beans, web services uniform resource identifiers (URI), web components, message queues, batch processes, data sources and combinations thereof.

5. The computer implemented method of claim 1, wherein the deployment patterns further comprise default patterns for deploying the set of application components to various isolated nodes having runtime containers therein, wherein the various isolated nodes includes, nodes located on separate hardware, nodes located on separate networks, and nodes running separate processes.

6. The computer implemented method of claim further comprising:

the computer receiving a set of user specified deployment preferences, wherein the user specified deployment preferences overrule at least one of the default patterns for clustering the set of application components, distributing the set of application components, scaling ratios for the set of application components, colocation requirements for the set of application components and duplicating requirements for the application components.

7. A computer program product for deploying an application, the computer program product comprising:

one or more computer-readable, tangible storage devices;

program instructions, stored on at least one of the one or more storage devices, to open an application archive for an application to be deployed onto a distributed computing environment;

program instructions, stored on at least one of the one or more storage devices, to identify a set of application components for the application;

program instructions, stored on at least one of the one or more storage devices, to identify at least one sets of rules defining application component deployment patterns for the set of application components; and program instructions, stored on at least one of the one or more storage devices, to deploy the set of application components to a set of runtime containers according to the at least one set of rules defining the application component deployment patterns, wherein the application component deployment patterns comprises default patterns for clustering the set of application components, distributing the set of application components, scaling ratios for the set of application components, colocation requirements for the set of application components and duplicating requirements for the application components.

8. The computer program product of claim 7, wherein the application archive includes extensible markup language metadata files that provide details on how to deploy the set of application components contained within the application archive.

9. The computer program product of claim 8, wherein the application archive is an enterprise application archive file, and wherein the extensible markup language metadata files are deployment descriptors for the set of application components.

10. The computer program product of claim 7, wherein the application components are selected from the group consisting of web applications, enterprise java beans, web services uniform resource identifiers (URI), web components, message queues, batch processes, data sources and combinations thereof.

11. The computer program product of claim 7, wherein the deployment patterns further comprise default patterns for deploying the set of application components to various isolated nodes having runtime containers therein, wherein the various isolated nodes includes, nodes located on separate hardware, nodes located on separate networks, and nodes running separate processes.

12. The computer program product of claim 7, further comprising:

receiving a set of user specified deployment preferences, wherein the user specified deployment preferences overrule at least one of the default patterns for clustering the set of application components, distributing the set of application components, scaling ratios for the set of application components, colocation requirements for the set of application components and duplicating requirements for the application components.

13. A computer system for deploying an application, the computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to open an application archive for an application to be deployed onto a distributed computing environment;

program instructions, stored on at least one of the one or more storage devices for execution by at least one of the one or more processors via at least one of the one or more memories, to identify a set of application components for the application;

program instructions, stored on at least one of the one or more storage devices for execution by at least one of the one or more processors via at least one of the one or more memories, to identify at least one sets of rules defining application component deployment patterns for the set of application components; and program instructions, stored on at least one of the one or more storage devices for execution by at least one of the one or more processors via at least one of the one or more memories, to deploy the set of application components to a set of runtime containers according to the at least one set of rules defining the application component deployment patterns, wherein the application component deployment patterns comprises default patterns for clustering the set of application components, distributing the set of application components, scaling ratios for the set of application components, colocation requirements for the set of application components and duplicating requirements for the application components.

14. The computer system of claim 13, wherein the application archive includes extensible markup language metadata files that provide details on how to deploy the set of application components contained within the application archive.

15. The computer system of claim 13, wherein the application archive is an enterprise application archive file, and wherein the extensible markup language metadata files are deployment descriptors for the set of application components.

16. The computer system of claim 13, wherein the application components are selected from the group consisting of web applications, enterprise java beans, web services uniform resource identifiers (URI), web components, message queues, batch processes, data sources and combinations thereof.

17. The computer system of claim 13, wherein the deployment patterns further comprise default patterns for deploying the set of application components to various isolated nodes having runtime containers therein, wherein the various isolated nodes includes, nodes located on separate hardware, nodes located on separate networks, and nodes running separate processes.

18. The computer system of claim 13, further comprising:
receiving a set of user specified deployment preferences, wherein the user specified deployment preferences overrule at least one of the default patterns for clustering the set of application components, distributing the set of application components, scaling ratios for the set of application components, colocation requirements for the set of application components and duplicating requirements for the application components.

\* \* \* \* \*